Figure 1:
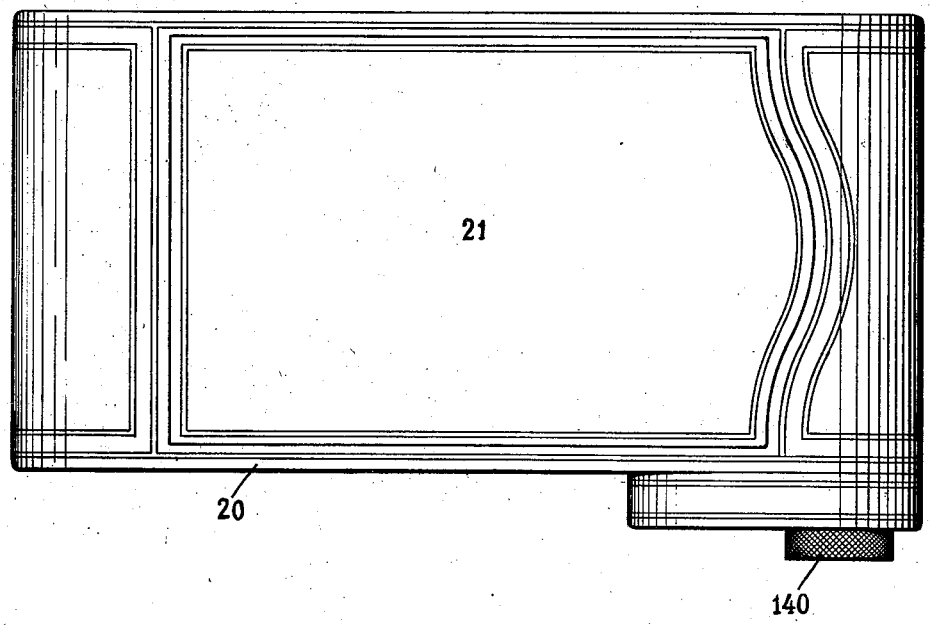

J. H. TRUMBULL.
CAMERA.
APPLICATION FILED AUG. 30, 1913.

1,146,291.

Patented July 13, 1915.
4 SHEETS—SHEET 1.

WITNESSES

INVENTOR
John H. Trumbull,
ATTORNEY.

J. H. TRUMBULL.
CAMERA.
APPLICATION FILED AUG. 30, 1913.
1,146,291.
Patented July 13, 1915.
4 SHEETS—SHEET 2.
Fig. 4.
Fig. 3.
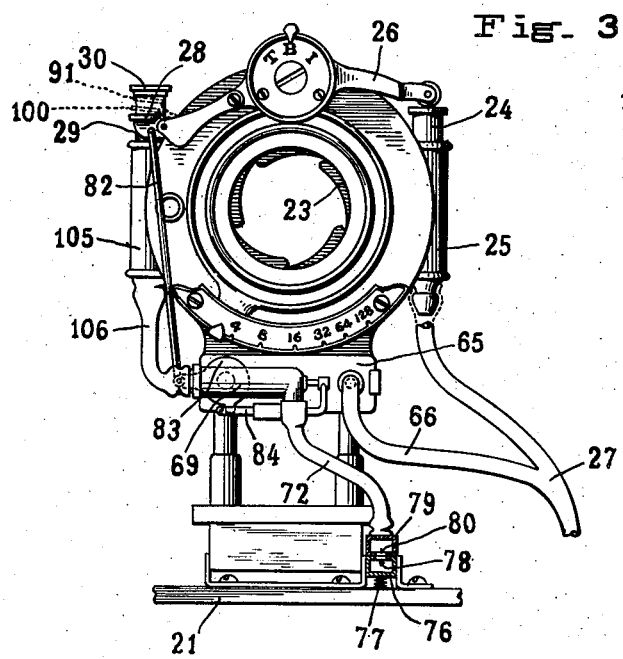
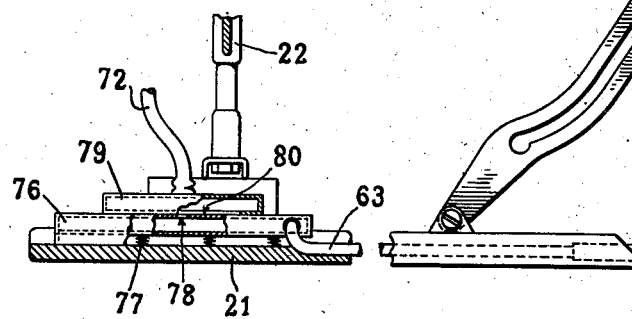
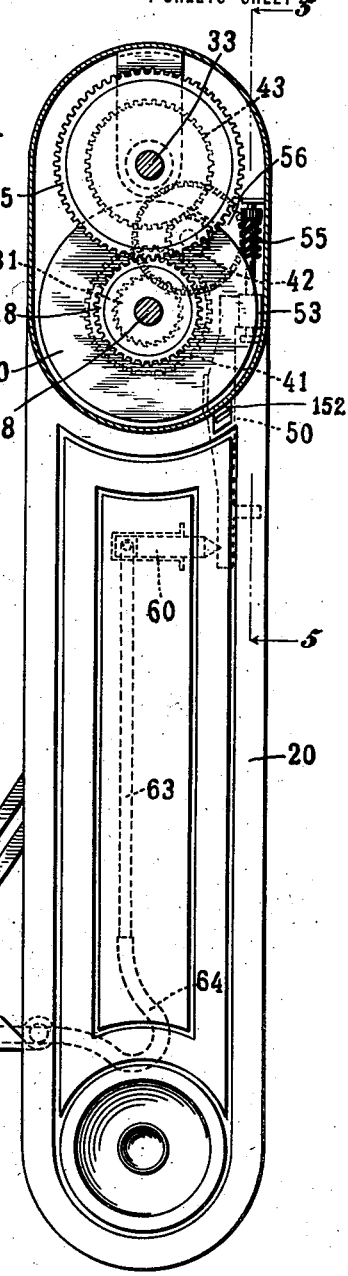
WITNESSES:
INVENTOR
John H. Trumbull,
ATTORNEY J. H. TRUMBULL.
CAMERA.
APPLICATION FILED AUG. 30, 1913.
1,146,291.
Patented July 13, 1915.
4 SHEETS—SHEET 3.
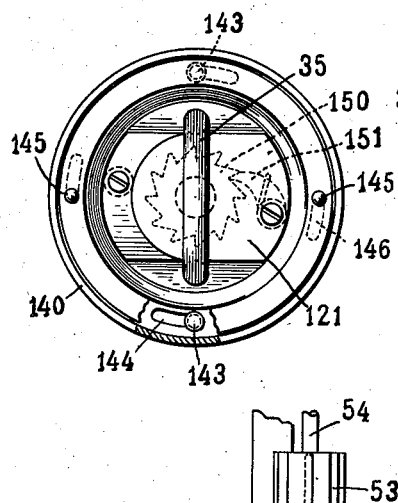
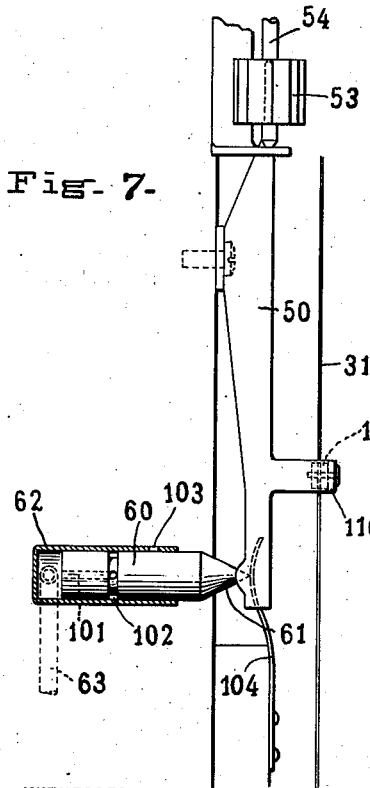
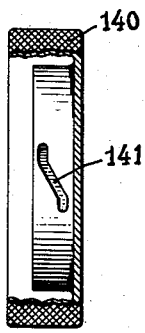
WITNESSES:
INVENTOR
John H. Trumbull,

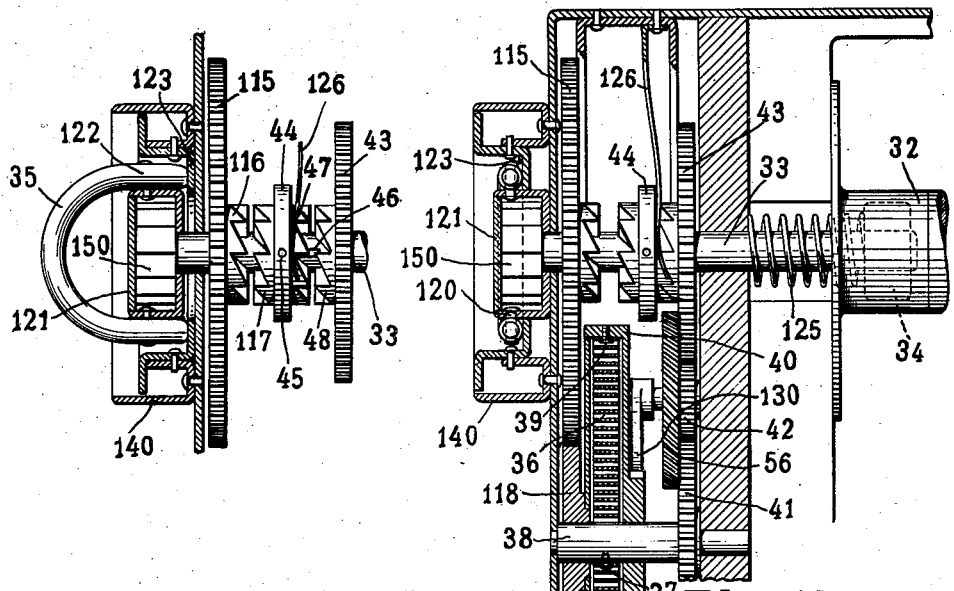

UNITED STATES PATENT OFFICE.

JOHN H. TRUMBULL, OF PLAINVILLE, CONNECTICUT.

CAMERA.

1,146,291.  Specification of Letters Patent.  Patented July 13, 1915.

Application filed August 30, 1913. Serial No. 787,406.

*To all whom it may concern:*

Be it known that I, JOHN H. TRUMBULL, a citizen of the United States of America, and residing at Plainville, in the county of Hartford and State of Connecticut, have invented new and useful Improvements in Cameras, of which the following is a specification.

My invention relates particularly to cameras of the so-called "magazine" or multiple exposure type, and one object of the invention is to prevent double exposure or the superposition of two pictures on a single film or plate.

Another object is to facilitate the operation of the camera so as to enable the operator to take a succession of pictures with greater rapidity than is possible with the mechanism ordinarily employed.

These objects are accomplished by automatically presenting a fresh expanse of the sensitized medium in position for exposure by the shutter of the camera after each exposure made by the shutter.

In the accomplishment of these objects the invention contemplates the employment of a power device or motor for shifting the sensitized medium and the placing of this motor under the control of the shutter mechanism whereby it will be caused to operate to place a fresh portion of the sensitized medium in position for exposure after each exposure is made by the shutter.

A special feature of the invention consists in utilizing the act of loading or placing the sensitized medium in position within the camera for the purpose of storing up the needed energy in the motor. In the practical embodiment of the invention which I have herein disclosed, the power is derived from a spring motor and the action necessary to the loading of the camera is taken advantage of for the purpose of winding up the spring of the said motor. The control of this motor is effected by suitable connections extending from the shutter mechanism.

A further special feature of the invention resides in the use of fluid pressure connections for the transmission of the controlling impulse from the shutter mechanism to the motor controller. When the shutter is to be operated by a compression bulb or other fluid pressure device, I propose to utilize the pressure thus created as the means for transmission of the controlling impulse to the motor. In a camera having an adjustable focus I propose to provide means for maintaining the continuity of the fluid pressure connections regardless of the adjustment necessary for focusing.

The invention is shown as applied to a folding camera where special provision is made to allow folding of the camera and to automatically provide the necessary connections when the camera is unfolded ready for use.

Another feature of the invention resides in the provision of means whereby the shutter may be operated either manually or by the usual compression bulb, as desired, the sensitized material being shifted automatically after each exposure in either event in readiness for the next exposure. I have also provided means for automatically controlling the operation for "instantaneous," "bulb" or "time" exposures in accordance with the setting of the shutter.

In a strip film camera as shown and described the film itself or its backing affords means for stopping the motor after it has moved the film the proper distance for a new exposure.

A further feature of the invention resides in the provision of means for rendering the automatic feed inoperative whereby the sensitized material may be shifted by hand instead of automatically as desired.

Various other features of the invention will appear as the specification proceeds.

In the accompanying drawings I have illustrated a practical embodiment of the invention as applied to a strip film camera of conventional folding type with adjustable focus. It will be understood however, that the invention is not limited to this particular disclosure but is susceptible of many changes and modifications, and I would further have it known that the claims are not limited to the forms shown and described and that the terms of the claims are terms of description rather than of limitation except as may be required by the state of the art.

Figure 2:
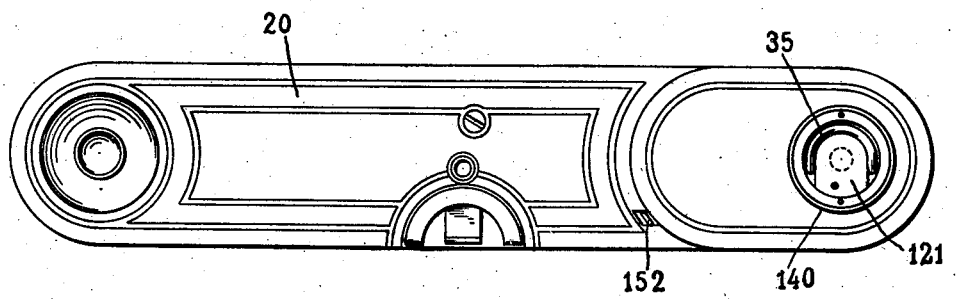

Figure 1, is a front view of one form of camera embodying the improvements of my invention, the camera being "closed". Fig. 2, is a side view of the same. Fig. 3, is a side elevation and partial sectional view, the camera being "open" but omitting the bellows and shutter mechanism. Fig. 4, is a front detail view of the lens mount and shutter mechanism, illustrating the sliding connections between the lens mount and the platform on which the lens mount is slidingly adjustable in section. Fig. 5, is a sectional view of the motor and control mechanism on a somewhat larger scale, this view being taken substantially on the line 5—5 of Fig. 3 and showing the parts in the position assumed after inserting the film and in position ready for the first exposure. Fig. 6, is a detail end view of the manually operable winding key. Fig. 7, is a broken detail view of the motor control mechanism taken on a plane substantially at a right angle to the plane of Fig. 5. Fig. 8, is a detached part-sectional view of the annular member which is operated to render the automatic control inoperative when it is desired to shift the film by hand instead of automatically. Fig. 9, is a view similar to Fig. 5 with the motor mechanism in the normal operative position and the winding key turned down in its normal inoperative position. Fig. 10 is a detail sectional view showing the annular member turned to permit the manual shifting of the film. Fig. 11, is a longitudinal sectional view of the valve mechanism which controls flow of the actuating fluid for the purpose of controlling the motor. Fig. 12, is a transverse sectional view of the same taken substantially on the plane of the line 12—12 of Fig. 11. Fig. 13, is a longitudinal sectional view of this mechanism taken substantially on the plane of the line 13—13 of Fig. 11. Fig. 14, is an enlarged detail view illustrating the engagement of the valve operating link by the oscillating shutter-operated member, this latter member appearing in section. Fig. 15, is a broken sectional view of the manually operable mechanism for actuating the shutter and effecting the automatic control of the film feeding means.

In the form of invention here disclosed the camera body 20 is provided with a hinged door 21 which when opened to the position shown in Fig. 3 constitutes a platform or support for the lens mount 22. This lens mount 22 as customary carries the shutter 23 and the mechanism for actuating the shutter. The shutter actuating mechanism as shown has a plunger 24 working in a cylinder 25 and engaging the outer end of the shutter arm 26, air for operating the plunger being supplied to the cylinder through the tube 27 from a suitable bulb or other air compressing device (not shown). In addition to this bulb operated mechanism there is a manually operable means for actuating the shutter, in the shape of a lever 28 adapted upon manual operation of the plunger 29 to be engaged by the head 30 of the said plunger and to be thereby caused to operate the shutter.

The film or strip of sensitized material 31 is wound on a spool 32 which spool is rotated by a spindle 33, the spindle having for the purpose a transverse key 34 on its inner end engaging a corresponding slot in the end of the spool. A winding key 35 is provided on the outer end of the spindle for turning it by hand.

The motor by which the automatic shifting of the film is accomplished is here shown as a spiral spring 36 connected at its inner end 37 with the arbor 38 and secured at its outer end 39 to the spring barrel 40. Suitable driving gearing is provided between the motor and the spindle and the same is here shown as a driving gear 41 on the arbor meshing with the intermediate gear 42 which in turn meshes with a gear 43 on the spindle. This gear 43 is loose on the spindle and imparts rotation to the spindle through the medium of a movable clutch member 44 slidingly keyed on the spindle by a pin 45 which engages in a slot 46 in the spindle, the said clutch member having a series of teeth 47 adapted to be engaged with a series of corresponding teeth 48 upon the gear 43.

Control of the motor is effected through the medium of a dog 50 pivoted at 51 and having a tooth 52 adapted to make engagement with the teeth 53 of a rotatable escapement member 54. This escapement member 54 also has a series of spiral teeth 55 meshing with the spiral gear 56 carried by the intermediate gear 42.

When placed under tension the spring exerts its force to turn the arbor 38 and hence the gear 41 fast on the arbor. This gear tends to rotate the intermediate gear 42 which in turn tends to rotate gear 43 on the spindle. It will be clear therefore that when the control dog has been withdrawn from engagement with the toothed escapement member 54, said member will be rotated by the spiral gear 56 and as the spiral gear is in effect a part of the intermediate gear, the said intermediate gear will rotate and will therefore impart rotation to the gear 43 on the spindle. When under these conditions the clutch member is in engagement with the teeth 48, of gear 43, the said gear will be clutched to the spindle and therefore impart rotation to said spindle and to the film winding spool.

Control of the motor controlling dog is effected in the present instance through the medium of fluid pressure connections extending from the shutter mechanism to a device which directly actuates the said dog. This latter device as illustrated in Figs. 3 and 7 consists of a plunger 60 having a point or cam end 61 engaging the free end of the control dog 50, the said plunger working in a cylinder 62 which is supplied with fluid under pressure through a tube 63. This tube has a flexible joint 64 in it adjacent the hinge support of the lens platform so as to permit the folding action of the camera.

The fluid pressure impulse for operating the device which lifts the control dog from engagement with the toothed escapement member, is obtained in the present instance by diverting a part of the compressed air used for operating the shutter, into a reservoir chamber 65 carried by the lens mount. This is accomplished by providing a branch 66 in the air supply tube 27, leading off from the tube to said reservoir. From this reservoir the air flows through a passage 68 into a valve chamber 69 provided with a spring-pressed valve 70, which controls flow through an outlet 71. From this outlet a tube 72 extends downwardly and makes connection with the tube 63 extending to the back of the camera. For the purpose of storing and holding the air the reservoir may be made with an expansible lining 73 and be provided with a check valve 74. There is also shown a spring pressed follower 75 which cushions the incoming charge of air and gives added force to the outgoing charge of air.

Allowance is made for adjustment of the lens head for focusing purposes, in the present instance, by the provision of a sliding joint in the fluid pressure connections between the shutter mechanism and motor control. This sliding joint is shown as a relatively stationary box 76 on the lens platform, pressed upward by springs 77 and provided with an opening 78 in its top, and a relatively movable box 79 carried by the lens mount in sliding contact with the top of the stationary box and provided with a slot 80 in the bottom thereof. This construction allows for the necessary adjustment of the lens without interfering with the continuity of the air connection.

In the type of shutter mechanism disclosed, the lever 28 is given a definite up and down movement each time the shutter is operated to make an exposure and the movement of this lever is utilized to operate the valve (70) which controls flow of the actuating impulse to the motor control. The operating connections between lever 28 and this valve, here take the form of a link 82 extending from the lever to one arm of an angular lever 83 and a link 84, slidably supported in a guide 85, engaging the stem 86 of the valve 70 at one end and provided with a stud 87 on its other end engaged by the other arm 88 of the lever 83. Lever 83 is pivoted to rock on the short conduit or passage 68.

In the illustration Fig. 4, the shutter control 90 has been set for "bulb" exposures and the parts are shown as they appear at the time of exposure, the bulb being pressed to hold the shutter open. When pressure on the bulb is released the shutter closes and the lever 28 moves into the upper dotted line position 91. During this upward movement of lever 28 the link 82 is pulled upward, partially rotating lever 83 and causing the arm 88 of said lever to act against the stud 87 and thereby draw the link 84 inward to open the valve 70. At the time this valve is opened the shutter has been closed and the exposure has been completed. When valve 70 is thus opened the air stored in the reservoir 65 passes out through the connections 72 and 63 to the control device 62, operating this device to lift the control dog 50 from engagement with the escapement member 54. The motor being now free to operate, shifts the film and places a fresh expanse of film in position ready for the next exposure.

The upper or normal position of the shutter lever 28 is indicated at 91 in Fig. 4 and the position of the rocking lever 83 and associated parts at this time is indicated in Fig. 11. In this position of lever 83 the arm 88 is on the left side of the stud 87. During the opening movement of the shutter the lever 28 moves from this normal position downward to the full line position in Fig. 4 and as lever 28 moves downward, lever 83 is rocked and the cam-like face 96 on the arm 88 of lever 83, engaging stud 87 springs link 84 over until the arm 88 finally passes to the right of the stud. The arm 88 being now at the right of the stud 87, upon the upward shutter-closing movement of lever 28 and the consequent upward rocking movement of lever 83, the arm 88 acting against the stud 87 will draw the link 84 over to open the control valve 70. In the making of a complete exposure therefore the shutter lever moves from an upper normal position of rest to an extreme downward position and back to the upper position. In the downward movement of the shutter lever the arm 88 of the rocking lever moves back in the manner described and obtains a grip on the valve-operating link 84 and having obtained this grip it operates toward the end of the upward shutter-closing movement of the shutter lever to open the valve and permit transmission of a control impulse to the motor. The arm 88 and stud 87 are so proportioned that as the shutter lever nears the end of its upward stroke and the rocking lever has almost completed its forward movement, the arm 88 will slip up over the stud 87, thereby releasing the link 84 and permitting the control valve to close under the influence of its spring. This releasing action is allowed for by reason of the ever-increasing distance of the stud 87 from the pivotal center of the rocking lever during the shifting of the link to open the valve.

When the shutter is set for "instantaneous" exposures, the shutter lever 28 has a movement similar to the movement for "bulb" exposures, except that its return upward movement is automatic. The action of the valve-actuating connections is consequently the same for instantaneous as for the bulb exposures only quicker. In taking "time exposures" however, the movement of the shutter lever is somewhat different. In this case the lever moves from the upper position down to the extreme lower position and back to an intermediate position indicated in dotted lines at 100 in Fig. 4 as usual in this type of shutter. In this intermediate position the shutter is held open and the parts are so proportioned that in this part-way upward movement of the shutter lever the control valve will have not yet been opened. Upon a second pressure on the shutter-actuating bulb, the shutter will be closed and the shutter lever will move from the intermediate position 100, back to its full upward position. In this latter movement of the lever from the intermediate to the upper position, the exposure having been completed, the valve-actuating connections now act to open the control valve and the controlling impulse is thereupon sent to the motor control device.

Exhaust of air from the motor control device is provided for by making the plunger of this device with a longitudinal passage 101 leading from the rear end of the plunger to an annular groove 102, which groove registers with an exhaust port 103 in the cylinder 62 when the plunger is in its forward position. A spring 104 bearing upon the head of the plunger serves to hold it normally in its retracted inactive position.

In the form of shutter illustrated the mechanism may be operated by hand as well as by a bulb or similar air-compressing device, and provision is therefore made for effecting the automatic film-shifting operation of the motor in either event. The plunger 29, by which the manual operation of the shutter is accomplished, is for this purpose mounted in a cylinder 105, which is connected by a tube 106 with the valve chamber 69. The plunger is held normally elevated by a spring 107 and a valve 108 is provided to check the reverse flow of the air compressed within the cylinder. When the plunger is depressed, the head 30 of the plunger engages and operates the shutter lever 28 (Fig. 15) and the air compressed beneath the plunger flows through the tube 106 into the valve chamber and into the expansible reservoir 73. Upon completion of the exposure, the shutter lever, through the connections described, operates the control valve and causes operation of the motor in the manner set forth above.

Automatic means are provided for automatically stopping the motor when it has shifted the pre-determined amount of film. This means here takes the form of a so-called "feeler" 110, connected to the control dog 50 and provided with a roller 111, bearing against the edge of the film strip 31. The film strip (that is, either the film proper or the backing strip which usually accompanies the film) is provided with marginal recesses 112, spaced according to the number of exposures on the film. When the feeler drops into one of these recesses it permits the control dog 50 to engage with the toothed escapement member, a spring 113 being provided for so shifting the dog when thus permitted by the feeler. From this it will be seen that when the motor control dog is released from holding engagement with the escapement member, the motor will operate to wind up and feed the film and will continue to operate until the feeler drops into the next marginal recess and permits the dog to again engage the escapement member.

The storing up of energy in the motor is accomplished in the present disclosure by the preliminary winding of the film into position ready for the first exposure. The mechanism for this purpose consists of a winding gear 115, loose on the spindle 33, provided with clutch teeth 116 arranged to be engaged by corresponding teeth 117 on the clutch member 44, and a gear 118 carried by the spring barrel 40, and in mesh with the winding gear. The engagement of the clutch member with the winding gear is effected by the act of turning the winding key 35 from its folded inoperative position, shown in Fig. 9, out into its operative position, Fig. 5, the key being pivoted at 120 to a head 121 engaged on the end of the spindle 33 and having its ends 122 arranged to engage with a relatively stationary abutment 123. As the key is turned up from its flattened or folded position, it will be seen that these ends 122 will bear against the abutment 123, which is in the form of a ring, and will thereby serve to draw the spindle longitudinally outward, thus carrying the clutch member into engagement with the winding gear. The spindle may be drawn still farther outward for the purpose of removing an exposed film and replacing a new spool and film, by simply pulling outward on the key, against the tension of spring 125. As the clutch member is slidingly keyed (45—46) on the spindle, it allows of this further outward movement of the spindle. A spring 126 is provided for forcing the clutch member toward the left to the extent of movement allowed it by the keyway 46. The clutch member is at the left hand end of its travel on the spindle in Fig. 9, and when the spindle is pulled out, the spring 126 causes the clutch member to travel along with the spindle until it meshes with the clutch 116 of the winding gear. When the key is lowered and the spring 125 is allowed to draw the spindle inward the left hand end of the keyway 46 engaging the key pin 45 draws the clutch member out of clutching engagement with the winding gear 115 and into engagement with the driven gear 43. From the foregoing it will be seen that when the winding key is turned up into the position shown in Fig. 5, the winding gear is clutched to the spindle and rotation then given the spindle for the purpose of winding the film into position ready for the first exposure therefore through the gears 115 and 118 turns the spring barrel 40 and winds the motor spring 36. The spring barrel is held against reverse rotation by a pawl 130 engaging with a ratchet 131 on the barrel.

As the barrel or drum 40 is in this instance the member which is rotated to wind the spring, some means are necessary for holding the other member of the motor (the arbor) while this winding is going on. This means is here in the form of a pivoted spring-pressed latch 135 arranged to interlock with a set of teeth 136 on the escapement member 54. This latch has an extension 137 standing in the path of the clutch member 44. Consequently when the clutch member is in its inward position with the driven gear clutched to the spindle (Fig. 9) the latch is thrown out of engagement with the teeth 136 and the escapement member is then held only by the control dog 50. When, however, the clutch member is shifted into engagement with the winding gear (Fig. 5) the clutch member no longer holds the latch but permits it to drop down into engagement with the teeth 136 of the escapement member. The escapement member being geared to the arbor therefore holds the arbor against rotation. The arbor being thus held stationary while the spring barrel is being rotated, the necessary energy will be stored up in the spring. The gearing preferably is so proportioned that the manual winding necessary for placing the film in position for exposure will be sufficient to wind the spring. Also the parts will usually be so arranged that the winding latch 135 will not be released until after the clutch member has made engagement with the drive gear 43.

In order that the spindle may be rotated by the automatic film winding means without imparting movement to the winding key, I have shown a one-way connection between the key and spindle in the form of a ratchet 150 fast on the end of the spindle arranged to be engaged by a pawl 151 on the head 121 which carries the key. This permits rotation of the spindle by the key but prevents the spindle when rotated by the motor, from turning the key.

As it may sometimes be desirable to shift the film manually instead of automatically, I have made provision for disconnecting the automatic feed mechanism, which means in the present instance takes the form of a cam ring 140 encircling the annular abutment 123 and provided with cam slots 141, in which are engaged the studs 142 on the abutment ring. A partial rotary movement is allowed the cam ring by supporting it on studs 143 engaging in segmental slots 144 in the ring. During the partial rotary movement of the adjusting cam ring, the abutment ring is guided in a straight in and out movement on the guide pins 145, the cam ring being slotted at 146 to permit the passage of these pins past the cam ring. The parts are so designed that when the cam ring has been turned to the position shown in Fig. 10, it will have lowered the abutment ring to a point where the turning of the winding key up into active position will shift the clutch member only far enough to unclutch the driven gear 43 and not far enough to clutch with the winding gear 115. Consequently the spindle is now for all practical purposes entirely independent of the motor and the spindle may therefore be turned to shift the film without affecting or being affected by the motor. When the automatic film winding mechanism is thus rendered ineffective, ordinary film (without the spaced recesses for the automatic motor stop) may be used in the camera the same as in an ordinary camera. The control dog 50 may be manually retracted by the slide 152.

The advantages of my invention will be readily appreciated, for it will be seen that by means of the automatic feed of the sensitized material after each exposure, the possibility of making double exposures is eliminated and one picture after another may be taken in quick succession without the need as heretofore present for stopping and shifting the sensitized material by hand after each exposure.

What I claim is:—

1. In combination, a camera arranged to contain sensitized medium for a plurality of exposures, a shutter, means for setting said shutter to make different kinds of exposures, actuating mechanism for moving said shutter to make the exposure for which the shutter has been set, a motor for shifting the sensitized medium into position for exposure by the shutter, a controller for said motor and connections from the mechanism which actuates the shutter to the said controller operative irrespective of the character of exposure for which the shutter has been set for operating said controller upon the completion of the exposure movement imparted by the shutter actuating mechanism to the shutter.

2. In combination, a camera adapted to contain a sensitized film, a shutter for exposing the film including a lever partaking of a definite movement at each exposure, means for setting the shutter for different kinds of exposures, a motor for shifting the film, a controller adapted to normally hold the motor inoperative, mechanism for operating the shutter, means for releasing the controller to permit operation of the motor and operating connections from the mechanism which operates the shutter to the said controller releasing means including the shutter lever aforesaid, whereby said controller releasing means will be operated upon the completion of the exposure movement of the said shutter lever.

3. In combination, a camera arranged to contain sensitized material for a plurality of exposures, power mechanism for shifting the sensitized material arranged to store up energy upon the moving of the sensitized material into operative position ready for exposure within the camera, a shutter for exposing the sensitized material, and mechanism for actuating the shutter arranged to control the power mechanism whereby to effect a movement of the sensitized material after each exposure made by the shutter.

4. In combination, a camera arranged to contain sensitized material for a plurality of exposures, a spring motor for shifting the sensitized material arranged to be actuated to store up energy by the moving of the sensitized material into position for exposure within the camera, a shutter, and mechanism for operating the shutter arranged to control the spring motor to effect a movement of the sensitized material after each exposure by the shutter.

5. In combination, a camera arranged to contain sensitized material for a plurality of exposures and power mechanism for shifting the sensitized material into position for exposure, arranged to be actuated to store up energy by the placing of the sensitized material within the camera.

6. In combination, a camera arranged to contain a strip of sensitized film, means for manually shifting the film to a position ready for exposure, and a spring motor for shifting the film arranged to be actuated to store up energy by the preliminary manual shifting of the film.

7. The combination in a camera, of a film winding spool and means for rotating the same, manually operable means engaging the spool rotating means for turning said spool to wind the film to a position ready for exposure and a spring motor having connection with the spool-rotating means during the manual operation aforesaid to store up power and arranged thereafter to have connection with the spool-rotating means for driving the same.

8. In a camera, means for rotating a film winding spool, a spring motor for operating the said spool-rotating means, manually operable means for turning the spool-rotating means to carry the film to a position ready for exposure, and a connection arranged during the said manual operation of the spool-rotating means to provide a driving connection between the spool-rotating means and the spring motor whereby the motor will store up energy and thereafter to provide a driving connection from the motor to the spool-rotating means whereby said motor can drive the spool-rotating means.

9. In a camera, a spindle for rotating a film winding spool, a motor for operating said spindle, manually operable means for turning said spindle to effect the preliminary film positioning movement of the spindle, a connecting device arranged during the preliminary manual operation of the spindle to provide a driving connection between the spindle and motor to cause the motor to store up energy and thereafter to provide a driving connection from the motor to the spindle and means controlling the film feeding operation of the motor.

10. In a camera, a spindle for rotating a film winding spool, a motor for operating said spindle, manually operable means for turning said spindle to effect the preliminary film positioning movement of the spindle, a connecting device arranged during the preliminary manual operation of the spindle to provide a driving connection between the spindle and motor to cause the motor to store up energy and thereafter to provide a driving connection from the motor to the spindle, shutter mechanism and means under control of the shutter mechanism for controlling the film feeding operation of the motor.

11. In a camera, a spindle for rotating a film winding spool, a motor for operating said spindle, a connecting device arranged in one position to provide a driving connection from the spindle to the motor whereby the motor will be operated to store up power and arranged in another position to provide a driving connection from the motor to the spindle, a winding key for the spindle lying normally in an inoperative position and arranged when shifted to operative position to shift the connecting device from the motor driving connection to the power storing connection, and means controlling the film feeding operation of the motor.

12. In a camera, a spindle for rotating a film winding spool, a spring motor, gearing between the spindle and motor for effecting the winding of the spring motor and the drive of the spindle from the motor, clutch mechanism for rendering the gearing effective for winding the motor or for driving the spindle from the motor, means controlling said clutch mechanism, and means controlling the film feeding operation of the motor.

13. In a camera, a spindle for rotating a film winding spool, a spring motor, gearing between the spindle and motor for effecting the winding of the spring motor and the drive of the spindle from the motor, clutch mechanism for rendering the gearing effective for winding the motor or for driving the spindle from the motor, a winding key for the spindle controlling said clutch mechanism and means controlling the film winding operation of the motor.

14. In a camera, a spindle for rotating a film winding spool, a spring motor, a gear loose on the spindle and having connection with the spring motor for winding the same, a second gear loose on the spindle and having connection with the spring motor to provide a drive from the motor to the spindle, a clutch member non-rotatably held on the spindle and adapted to be engaged with either the winding gear or the drive gear, means controlling said clutch member and means controlling the film winding operation of the motor.

15. In a camera, a longitudinally shiftable spindle for rotating a film winding spool, a winding key for the spindle lying normally in inoperative position and arranged when shifted to operative position to move the spindle longitudinally, a spring motor, gearing between the spindle and motor, and means operated by the longitudinal shifting of the spindle for rendering the gearing effective for winding the spring motor when the key is shifted to operative position and for rendering the gearing effective to drive the spindle from the motor when the key is shifted to inoperative position.

16. In a camera, a spindle for rotating a film winding spool, a spring motor including an arbor, a spring barrel and a spring connected between the arbor and the barrel, gearing between the spindle and one member of the spring motor for winding up the spring, means holding said member against reverse rotation, a device for holding the other member of the spring motor during the winding of the spring, gearing between said other member of the spring motor and the spindle for driving the spindle from the motor, clutch mechanism adapted in one position to render effective the winding gearing between the spindle and motor and in another position to release the holding device and render effective the driving gearing from the motor to the spindle, and means controlling the driving operation of the motor.

17. In a camera, a spindle for rotating a film winding spool, a spring motor including driving and driven members and a power spring connected between said members, gearing between the spindle and the driven member of the motor for winding up the spring, means holding said member against reverse rotation, gearing between the driving member of the spring motor and the spindle, means controlling operation of either the winding gearing or the driving gearing, and a device for holding the driving member during the spring-winding movement of the driven member adapted to be rendered inoperative when the driving gearing is operative.

18. In a camera, a shutter, mechanism for operating the same, a fluid pressure reservoir, a motor for shifting the sensitized material, a pressure actuated device for controlling the motor, fluid pressure connections from the reservoir to the said device, and a shutter controlled valve controlling flow through said connections.

19. In a camera, a spring motor including a power spring connected between driving and driven members, winding gearing for the driven member of the motor, a movable member operable when shifted to one position to render the winding gearing operative for winding the power spring and a latching device operated by said member to hold the driving member when the winding gearing is operative.

20. In combination, a camera arranged to contain a strip of sensitized material, a spring motor for winding the strip disposed adjacent one edge of the strip and provided with a toothed escapement member, a dog disposed alongside the edge of the strip of material, pivotally supported at a point intermediate its ends and provided with a tooth at its front end extending toward the toothed escapement member to engage the teeth in said toothed member, and a feeler carried by the opposite end of the dog and projecting toward the adjacent edge of the strip to be operated by engagement with the edge of the strip.

21. In combination, a camera, a film in said camera consisting of a strip of sensitized material and an accompanying backing strip provided with longitudinally spaced marginal recesses therein, a motor for feeding the film, a controller for said motor and a feeler connected to the controller, disposed to engage the edge of the backing strip and arranged when engaged in one of the recesses in the edge of said backing strip to permit the controller to maintain the motor inoperative.

22. In combination, a camera adapted to contain a sensitized film, a motor for moving the film, manually operable means for placing the film in position for exposure, means operated during said manual placement of the film for storing up energy in the motor, means for rendering the motor operative to shift the film and means for automatically rendering the motor inoperative after a predetermined amount of film has been shifted thereby.

23. In combination, a camera adapted to contain a sensitized film, a motor for moving the film, manually operable means for placing the film in position for exposure, means operated during said manual placement of the film for storing up energy in the motor, shutter mechanism, means operated by said shutter mechanism for rendering the motor operative to shift the film and means for automatically rendering the motor inoperative after a predetermined amount of film has been shifted thereby.

24. In combination, a camera adapted to contain a sensitized film, a motor for winding said film, a controller for said motor, a shutter provided with an oscillating lever, pneumatically operated mechanism for actuating the shutter, a pneumatically operated device for operating the motor controller, valve mechanism controlling flow to said pneumatically operated device, and connections from the oscillating shutter lever to said valve mechanism for effecting the operation of the controller operating device after actuation of the shutter operating mechanism.

25. In combination, a camera adapted to contain sensitized film, a motor for winding said film, a shutter, bulb controlled mechanism for actuating the shutter, manually operable means for actuating the shutter and a controller for the motor arranged to be operated by either said bulb mechanism or said manually operable shutter actuating mechanism.

26. In combination, a camera adapted to contain a sensitized film, means for shifting said film, a motor for operating said film shifting means, shutter mechanism, means controlled by said shutter mechanism for rendering the motor operative to drive the film shifting means after each exposure made by the shutter mechanism, means for disconnecting the motor from the film shifting means and manually operable means for driving the film shifting means when the motor is disconnected from said film shifting means whereby the film may be fed automatically by the said motor or by the said manually operable means.

27. In a camera, a spindle for rotating a film spool, a winding key for said spindle pivotally supported to swing from an inoperative to an operative position, an abutment arranged to be engaged by said key to effect a longitudinal movement of the spindle as the key is turned to operative position, means for shifting the abutment to vary the operation of the same, a motor, and gearing between the spindle and motor adapted to be rendered operative upon the longitudinal movement of the spindle.

28. In a camera, a spindle for rotating a film spool, a winding key for said spindle pivotally supported to swing from an inoperative to an operative position, an annular abutment arranged to be engaged by said key to effect a longitudinal movement of the spindle as the key is turned to operative position, a rotatable annulus having a cam connection with the annular abutment for shifting the abutment to vary the action of the same, a spring motor, and gearing between the spindle and motor adapted to be rendered operative to wind the spring of the motor upon longitudinal movement of the spindle.

29. In a camera, a spindle for rotating a film spool, a motor for driving said spindle and a winding key for the spindle having a one-way connection with the spindle whereby to permit said winding key to remain relatively stationary while the spindle is being rotated by the motor.

30. In a camera, a spindle for rotating a film spool, a spring motor for driving said spindle, a winding key for manually operating the spindle, and pawl and ratchet connection between the winding key and spindle arranged to permit said winding key to remain relatively stationary while the spindle is being rotated by the motor.

31. In a camera, a spindle for rotating a film spool, a ratchet on the end of the spindle, a motor for driving said spindle, a key loosely engaged on the spindle and a pawl carried by said key arranged to engage the ratchet.

32. In a camera provided with a foldable lens platform, a motor for automatically winding the film after each exposure, a lens mount and shutter mechanism adjustable on the lens platform, and fluid pressure connections between the shutter mechanism and motor for controlling the motor from the shutter mechanism including a relatively stationary chamber on the platform open at the top and a chamber on the lens mount open at the bottom making sliding contact with the first chamber.

33. In a camera, a spindle for rotating a film spool, a winding key for said spindle pivotally supported to swing from an inoperative to an operative position, an abutment arranged to be engaged by said key to effect a longitudinal movement of the spindle as the key is turned to operative position, means for shifting the abutment to vary the operation of the same and a motor having parts operated by the longitudinal movement of the spindle.

34. In a camera, a spindle for rotating a film winding spool, a gear on the spindle and a spring motor for driving the spindle, including a power spring, an arbor driven thereby, a gear on the arbor, an intermediate gear driven by said arbor gear and meshing with the gear on the spindle, an escapement member driven by the intermediate gear and a controller arranged to engage with said escapement member.

35. In a camera, a spindle for rotating a film winding spool, a drive gear on the spindle, a winding gear on the spindle, means for clutching either the drive gear or the winding gear to the spindle, and a motor for driving the spindle, comprising a spring barrel, a gear carried thereby in mesh with the winding gear on the spindle, means holding the spring barrel against reverse rotation, an arbor, a power spring connected between the arbor and the spring barrel, a gear on the arbor, an intermediate gear rotated by said arbor gear and making driving engagement with the drive gear on the spindle, an escapement member rotated by the intermediate gear, a controller arranged to engage the escapement member, and means for releasing the controller from holding engagement with the escapement member.

36. In a camera, a spindle for rotating a film winding spool, a drive gear on the spindle, a winding gear on the spindle, means for clutching either the drive gear or the winding gear to the spindle, and a motor for driving the spindle, comprising a spring barrel, a gear carried thereby in mesh with the winding gear on the spindle, means holding the spring barrel against reverse rotation, an arbor, a power spring connected between the arbor and the spring barrel, a gear on the arbor, an intermediate gear rotated by said arbor gear and making driving engagement with the drive gear on the spindle, an escapement member rotated by the intermediate gear and a latch arranged to hold the escapement member when the winding gear is operative and to release the escapement member when the drive gear is operative.

37. In a camera, a spindle for rotating a film winding spool, a drive gear on the spindle, a winding gear on the spindle, means for clutching either the drive gear or the winding gear to the spindle, and a motor for driving the spindle, comprising a spring barrel, a gear carried thereby in mesh with the winding gear on the spindle, means holding the spring barrel against reverse rotation, an arbor, a power spring connected between the arbor and the spring barrel, a gear on the arbor, an intermediate gear rotated by said arbor gear and making driving engagement with the drive gear on the spindle, a toothed escapement member rotated by the intermediate gear, a pivoted dog arranged to engage the teeth of said escapement member, and means for releasing the dog from holding engagement with the escapement member.

38. In a camera, a shutter, mechanism for operating the same, an adjustable support for said mechanism, a fluid pressure reservoir mounted on the support, a motor for shifting the sensitized material, a pressure actuated device for controlling the motor, and fluid pressure connections from the reservoir to the said device.

39. In a camera, a shutter, mechanism for operating the same, an adjustable support for said mechanism, a fluid pressure reservoir mounted on the support, a motor for shifting the sensitized material, a pressure actuated device for controlling the motor, fluid pressure connections from the reservoir to the said device and valve mechanism controlling flow through said connections.

40. In a camera, a shutter, mechanism for operating the same, an adjustable support for said mechanism, a fluid pressure reservoir mounted on the support, a motor for shifting the sensitized material, a pressure actuated device for controlling the motor, fluid pressure connections from the reservoir to the said device, and a shutter controlled valve controlling flow through said connections.

41. In a camera, shutter mechanism including an oscillating shutter lever, a rocking lever actuated thereby and provided with an arm, fluid pressure connections, a valve in said connections, a link for operating the valve, arranged to be operated by the arm of the rocking lever, a motor for presenting an unexposed section of sensitized material in position for exposure, and a pressure actuated device in communication with the fluid pressure connections arranged to control operation of the motor.

42. In a camera, shutter mechanism including an oscillating shutter lever, a rocking lever actuated thereby, a motor for presenting unexposed sections of sensitized material in position for exposure, a pressure actuated device controlling operation of the motor, fluid pressure connections leading to said device, a valve controlling flow through said connections, and a link for operating the valve, the said link and the rocking lever having coöperating shoulders adapted in the movement of the lever in one direction to move past each other and in the movement of the lever in the opposite direction to interlock and impart a valve operating movement to the link.

43. In a camera, a shutter, manually operable shutter actuating mechanism adapted to be operated first to open the shutter and hold it open through a controlled period of time and then to be operated a second time to close the shutter, a motor for presenting unexposed sections of the sensitized medium in position for exposure by the shutter, and controlling means independent of the shutter and actuated by the shutter actuating mechanism after the shutter closing action of said shutter actuating mechanism to render the motor operative.

44. In a camera, a spindle for rotating a film winding spool, a winding key for manually operating said spindle, a motor for driving the spindle, gearing between the motor and spindle, and clutch mechanism controlled by the winding key for rendering the gearing operative or inoperative at will.

45. In a camera, a spindle for rotating a film winding spool, a motor for driving the spindle, gearing between the motor and spindle, a shutter, means for operating said shutter, means controlled by said shutter operating means for releasing said motor to drive said spindle, manually operable means for rendering the said gearing inoperative and means for manually rotating the spindle independently of the motor when said gearing is inoperative.

46. In a camera, a spindle for rotating a film winding spool, means for manually rotating the spindle, a motor for driving the spindle, a set of winding gears from the spindle to the motor, a set of drive gears from the motor to the spindle, and means for selectively controlling the two sets of gears.

47. In a camera, a spindle for rotating a film winding spool, means for manually rotating the spindle, a motor for driving the spindle, a set of winding gears from the spindle to the motor, a set of drive gears from the motor to the spindle, means for selectively controlling the two sets of gears, the said controlling means arranged further to render both sets of gears inoperative whereby to permit the manual operation of the spindle independent of said gears.

48. In a camera, a spindle for shifting the sensitized material, a winding key for said spindle arranged to be turned from an inoperative to an operative position, a spring motor, gearing between the spindle and motor for energizing the motor from the spindle, gearing between the motor and spindle for driving the spindle from the motor, clutch mechanism for rendering either the winding gearing or the driving gearing operative or for rendering both inoperative, and a shiftable member engaged by the winding key when the key is turned to its operative position and adapted thereupon to operate the clutch mechanism, said shiftable member adapted in one position to cause the gearing to remain inoperative and in another position to render the winding gearing effective.

49. In a camera, a longitudinally movable spindle, a winding key on said spindle pivoted to swing from an inoperative to an operative position, a spring motor, a winding gear loose on the spindle and having connection with the motor, a drive gear loose on the spindle and having connection with the motor, a clutch member on the spindle between the winding and drive gears thereon and movable with the spindle into engagement with either gear or into an intermediate position disengaged from both gears, and a shiftable abutment engaged by the winding key and adapted when the key is turned to its operative position to effect a longitudinal movement of the spindle, said abutment adapted in one position to cause a movement of the spindle and clutch member sufficient to render the winding gear operative and adapted in another position to cause a movement of the spindle and clutch member sufficient only to disengage the clutch member from both the drive gear and winding gear.

50. In a camera, the combination with shutter mechanism and means for setting the shutter mechanism to make different kinds of exposures, a motor for automatically presenting a fresh expanse of sensitized medium in position for exposure after each exposure made by the shutter mechanism, and controlling means for the motor operated by the shutter mechanism and controlled in its operation by the said setting means.

51. In a camera, the combination of shutter mechanism including a member partaking of a certain definite movement upon the making of each complete exposure, means for setting the shutter mechanism to make different kinds of exposures, motor mechanism for shifting the sensitized medium, a control device for the motor and control connections between the shutter mechanism and motor control device including means arranged to be operated by the movable member of the shutter mechanism upon the completion of each exposure made by said shutter mechanism.

52. In a camera, a spindle arranged for engagement with a film winding spool and longitudinally shiftable to permit engagement of the spool with said spindle, a motor for driving the spindle, and gearing connections between the motor and spindle arranged to be operatively engaged and disengaged by longitudinal shifting movement of the spindle and including a member on the spindle slidably engaged thereon to permit the additional shifting movement of the spindle necessary when engaging the film spool.

53. In a camera, a spindle arranged for engagement with a film winding spool and longitudinally shiftable to permit said spindle being withdrawn when engaging a spool therewith, a motor for driving the spindle, gearing connections between the motor and spindle including a member movable with the spindle and arranged upon withdrawal of the spindle to effect driving engagement between the motor and spindle, the said member being slidably keyed to the spindle to permit the further withdrawal of the spindle necessary for the purpose of engaging a spool therewith, and means for shifting the spindle either for the purpose of engaging the spool or to control the gearing connections.

54. In a camera, a spindle arranged for engagement with a film winding spool and longitudinally shiftable to permit engagement and disengagement of the spool and spindle, a motor, and gearing connections between the motor and spindle, controlled by longitudinal shifting movements of the spindle.

55. In a camera, a spindle for rotating a film winding spool, a manually operable winding key mounted on said spindle and adapted to be moved from an inoperative to an operative position, a motor, gearing between the motor and spindle including a member shiftable for connecting and disconnecting the motor and spindle and means engaged by the winding key in moving the same from inoperative to operative position for shifting said member to thereby control the said gearing.

56. In a camera, a spindle for rotating a film winding spool, a spring motor including a power spring connected between driving and driven members, gearing from the driving member of the motor to the spindle, winding gearing for the driven member of the motor, a movable member operable when shifted to one position to render the winding gearing operative for winding the power spring and a latching device operated by said member to hold the driving member when the winding gearing is operative.

57. In combination, a camera adapted to contain a roll of sensitized material, a spring motor for shifting the sensitized material, a control member normally holding the motor inoperative, shutter mechanism, means under control of the shutter mechanism for releasing the control member after each exposure and a manually operable device for releasing the control member independently of the control exercised by the shutter mechanism.

58. In combination, a camera adapted to contain sensitized material, a motor for shifting the sensitized material, a fluid pressure operated device for controlling the motor, a shutter, a cylinder, a plunger in said cylinder, a lever for operating the shutter connected with the plunger and arranged to be operated by said plunger upon the depression thereof by hand, and fluid pressure connections from the cylinder to the pressure operated control device for conveying actuating fluid compressed in the cylinder to said control device upon operation of the plunger to actuate the lever to operate the shutter.

59. In combination, a camera adapted to contain sensitized material, a motor for shifting the sensitized material, a fluid pressure operated device for controlling the motor, a shutter, a lever for operating the shutter, a cylinder adjacent the lever, a plunger working in said cylinder and having a part overlying the lever whereby to operate said lever upon actuation of the plunger and fluid pressure connections from the cylinder to the pressure operated control device.

60. In a camera, a casing adapted to contain sensitized film for a plurality of exposures, means for shifting said film, a motor for driving said film shifting means, means controlling the film shifting operation of said motor, manually operable means for driving said film shifting means, and means for disconnecting said motor to render the motor inoperative and simultaneously rendering the manually operable means operative for shifting the film independently of the motor.

61. In a camera, a spindle for shifting the sensitized material, a winding key for said spindle arranged to be turned from an inoperative to an operative position, a spring motor, gearing between the spindle and motor, clutch mechanism for rendering the gearing operative or inoperative, a shiftable abutment ring engaged by the winding key when the key is turned to its operative position and adapted thereupon to operate the clutch mechanism, and a cam ring engaging the abutment ring for shifting the same in respect to the winding key whereby in the one position to cause the gearing to remain inoperative and in another position to render the winding gearing effective.

JOHN H. TRUMBULL.

Witnesses:
C. W. JONES,
MORRIS ELMORE CLARK.